(12) United States Patent
Wang et al.

(10) Patent No.: US 8,923,196 B2
(45) Date of Patent: Dec. 30, 2014

(54) UPLINK CONTROL CHANNEL RESOURCE COLLISION RESOLUTION IN CARRIER AGGREGATION SYSTEMS

(75) Inventors: Yiping Wang, Allen, TX (US); Mark Andrew Earnshaw, Kanata (CA); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 103 days.

(21) Appl. No.: 13/425,299

(22) Filed: Mar. 20, 2012

(65) Prior Publication Data

US 2013/0242814 A1 Sep. 19, 2013

Related U.S. Application Data

(60) Provisional application No. 61/612,182, filed on Mar. 16, 2012.

(51) Int. Cl.
*H04W 4/00* (2009.01)

(52) U.S. Cl.
USPC ........................................................ 370/328

(58) Field of Classification Search
CPC .................................................. H04W 80/04
USPC ............... 370/310, 328, 317, 310.2; 455/423, 455/67.13, 425, 434, 501, 504, 63.1
See application file for complete search history.

(56) References Cited

U.S. PATENT DOCUMENTS

| | | | |
|---|---|---|---|
| 7,924,754 B2 * | 4/2011 | Bergman et al. | 370/310 |
| 8,122,313 B2 * | 2/2012 | Wang et al. | 714/750 |
| 8,125,941 B2 * | 2/2012 | Trainin et al. | 370/328 |
| 8,520,757 B2 | 8/2013 | Kishiyama et al. | |
| 8,565,066 B2 | 10/2013 | Nam et al. | |
| 2009/0247174 A1 | 10/2009 | Zhang et al. | |
| 2009/0265599 A1 | 10/2009 | Chae et al. | |
| 2010/0232382 A1 | 9/2010 | Gauvreau et al. | |
| 2011/0243066 A1 | 10/2011 | Nazar et al. | |
| 2011/0319068 A1 | 12/2011 | Kim et al. | |
| 2012/0106478 A1 | 5/2012 | Han et al. | |
| 2012/0113907 A1 | 5/2012 | Baldemair et al. | |
| 2012/0155337 A1 | 6/2012 | Park | |
| 2012/0257554 A1 | 10/2012 | Kim et al. | |

FOREIGN PATENT DOCUMENTS

WO 2011/132721 10/2011

OTHER PUBLICATIONS

Huawei; "Resource Allocation for Uplink ACK/NACK Multiplexing"; 3GPP TSG RAN WG1 Meeting #62 (R1-104282); Madrid, Spain; Aug. 23-27, 2010; 5 pages.

Samsung; "PUCCH HARQ-ACK Resource Mapping for DL CA"; 3GPP TSG RAN WG1 #62 (R1-104582); Madrid, Spain; Aug. 23-28, 2010; 3 pages.

Samsung; "PUCCH HARQ-ACK Resource Indexing for CL CA"; 3GPP TSG RAN WG1 #61 (R1-103002); Montreal, Canada; May 10-14, 2010; 3 pages.

(Continued)

Primary Examiner — Chandrahas Patel
(74) Attorney, Agent, or Firm — Fish & Richardson P.C.

(57) ABSTRACT

Systems, methods, and apparatuses of a wireless communications network include identifying a resource collision between uplink channels for acknowledgement/negative acknowledgement (ACK/NACK) signaling of a first component carrier and a second component carrier. An indicator representative of the ACK/NACK signaling of the first component carrier and the second component carrier can be identified.

19 Claims, 8 Drawing Sheets

(56) References Cited

OTHER PUBLICATIONS

International Search Report and Written Opinion of the International Searching Authority issued in International Application No. PCT/US2012/051043 on Feb. 6, 2013; 22 pages.

International Search Report and Written Opinion of the International Searching Authority issued in International Application No. PCT/US2012/051045 on Feb. 6, 2013; 25 pages.

3GPP TS 36.213 V10.4.0 (Dec. 2011); 3rd Generation Partnership Project; Technical Specification Group Radio Access Network; Evolved Universal Terresrial Radio Access (E-UTRA); Physical Layer Procedures (Release 10); 125 pages.

Research in Motion, UK Limited; "Design of HARQ and Scheduling Timing Linkage to Support Inter-band CA with Different TDD Configurations"; 3GPP TSG RAN WG1 Meeting #68; R1-120336; Feb. 6-10, 2012; Dresden, Germany; 4 pages.

MCC Support; "Final Report of 3GPP TSG RAN WG1 #66 v1.0.0"; 3GPP TSG WG1 Meeting #66bis; R1-112886; Oct. 10-14, 2011; Zhuhai, China; 104 pages.

MCC Support; "Final Report of 3GPP TSG RAN WG1 #66bis v1.0.0, Zhuhai, P. R. China, Oct. 10-14, 2011"; 3GPP TSG RAN WG1 Meeting #67; R1-114352; San Francisco, USA, Nov. 14-18, 2011; 84 pages.

MCC Support; "Final Report of 3GPP TSG RAN WG1 #67 v1.0.0 San Francisco, USA, Nov. 14-18, 2011"; 3GPP TSG RAN WG1 Meeting #68; R1-120001; Dresden, Germany, Feb. 6-10, 2012; 89 pages.

CATT; "Design of TDD Inter-band Carrier Aggregation"; 3GPP TSG RAN WG1 Meeting #67 (R1-113724); San Francisco, California; Nov. 14-18, 2001; 6 pages.

CATT; "TDD Inter-band Carrier Aggregation"; 3GPP TSG RAN WG1 Meeting #68 (R1-120091); Dresden, Germany; Feb. 6-10, 2012; 4 pages.

Huawei; "Simultaneous Transmission of CQI, ACK/NACK or SRI on PUCCH in Carrier Aggregation"; 3GPP TSG RAN WG1 Meeting #61bis (R1-103887); Dresden, Germany; Jun. 28-Jul. 2, 2010; 8 pages.

Intel Corporation; "Discussion on HARQ Feedback of TDD Inter-band Carrier Aggregation"; 3GPP TSG-RAN WG1 #67 (R1-113951); San Francisco, California; Nov. 14-18, 2011; 6 pages.

LG Electronics; "Details on Full-Duplex Based TDD CA with Different UL-DL Configurations"; 3GPP TSG RAN WG1 #69 (R1-122273); Prague, Czech Republic; May 21-25, 2012; 9 pages.

MediaTek Inc.; "Discussion on HARQ Feedback Mechanism and Cross-Carrier Scheduling in Inter-band CA with Different TDD UL-DL Configurations"; 3GPP TSG RAN WG1 Meeting #67 (R1-113864); San Francisco, California; Nov. 14-18, 2011; 6 pages.

Motorola; "Uplink ACK/NACK Transmission Format for Carrier Aggregation" 3GPP TSG RAN1#61bis (R1-103934); Dresden, Germany; Jun. 28-Jul. 2, 2010; 3 pages.

New Postcom; "Discussion on TDD Inter-band CA with Different UL-DL Configuration"; 3GPP TSG RAN WG1 Meeting #67 (R1-113685); San Francisco, California; Nov. 14-18, 2011; 6 pages.

Nokia, Nokia Siemens Networks; "UL ACK/NAK Feedback in LTE-A TDD"; 3GPP TSG RAN WG1 Meeting #60 (R1-101419); San Francisco, California; Feb. 22-26, 2010; 4 pages.

Pantech; "Discussion on Specification Impacts of Different TDD UL-DL Configuration"; 3GPP TSG RAN1 #67 (R1-113829); San Francisco, California; Nov. 14-18, 2011; 5 pages.

Research in Motion UK Limited; "Design of HARQ and Scheduling Timing Linkage to Support Inter-band CA with Different TDD Configurations"; 3GPP TSG RAN WG1 Meeting #68 (R1-120336); Dresden, Germany; Feb. 6-10, 2012; 4 pages.

International Search Report and Written Opinion of the International Searching Authority issued in International Application No. PCT/US2012/051037 on Oct. 23, 2012; 12 pages.

International Search Report and Written Opinion of the International Searching Authority issued in International Application No. PCT/US2012/051042 on Oct. 23, 2012; 12 pages.

Invitation to Pay Additional Fees and Partial International Search Report issued in International Application No. PCT/US2012/051045 on Nov. 21, 2012; 5 pages.

LG Electronics; "Resource Allocation for ACK/NACK PUCCH"; 3GPP TSG RAN WG1 #61bis (R1-103728); Dresden, Germany; Jun. 28-Jul. 2, 2010; 6 pages.

Pantech; "View on Open Questions for CA with Different TDD Configuration"; 3GPP TSG RAN1 #68 (R1-120316); Dresden, Germany; Feb. 6-10, 2012; 7 pages.

Qualcomm Incorporated; "Conveying Multiple ACKs on UL in Support of CA"; 3GPP TSG RAN WG1 #60bis (R1-102320); Beijing, China; Apr. 12-16, 2010; 5 pages.

Invitation to Pay Additional Fees and Partial International Search Report issued in International Application No. PCT/US2012/051043 on Nov. 15, 2012; 6 pages.

Office Action issued in U.S. Appl. No. 13/425,088 on Oct. 11, 2013; 17 pages.

Office Action issued in U.S. Appl. No. 13/425,268 on Oct. 11, 2013; 11 pages.

Office Action issued in U.S. Appl. No. 13/425,341 on Sep. 16, 2013; 8 pages.

Office Action issued in U.S. Appl. No. 13/425,088 on Feb. 21, 2014; 19 pages.

Office Action issued in U.S. Appl. No. 13/425,268 on Feb. 20, 2014; 12 pages.

Office Action issued in U.S. Appl. No. 13/425,341 on Feb. 5, 2014; 9 pages.

Office Action issued in U.S. Appl. No. 13/425,341 on May 27, 2014.

3GPP TS 36.211 V10.4.0 (Dec. 2011); 3rd Generation Partnership Project; Technical Specification Group Radio Access Network; Evolved Universal Terrestrial Radio Access (E-UTRA); Physical Channels and Modulation Release 10); 101 pages.

3GPP TS 36.213 V10.4.0 (2011-12); 3rd Generation Partnership Project; Technical Specification Group Radio Access Network; Evolved Universal Terrestrial Radio Access (E-UTRA); Physical Layer Procedures (Release 10); 125 pages.

MCC Support; Final Report of 3GPP TSG RAN WG1 #66 v1.0.0; Aug. 22nd through 26th, 2011; Athens, Greece; R1-112886.

MCC Support; Final Report of 3GPP TSG RAN WG1 #68 v1.0.0 (Dresden, Germany, Feb. 6th-10th , 2012); R1-120951.

International Preliminary Report on Patentability under Chapter I issued in International Application No. PCT/US2012/051037 on Sep. 25, 2014; 8 pages.

International Preliminary Report on Patentability under Chapter I issued in International Application No. PCT/US2012/051042 on Sep. 25, 2014; 7 pages.

International Preliminary Report on Patentability under Chapter I issued in International Application No. PCT/US2012/051043 on Sep. 25, 2014; 14 pages.

International Preliminary Report on Patentability under Chapter I issued in International Application No. PCT/US2012/051045 on Sep. 25, 2014; 16 pages.

\* cited by examiner

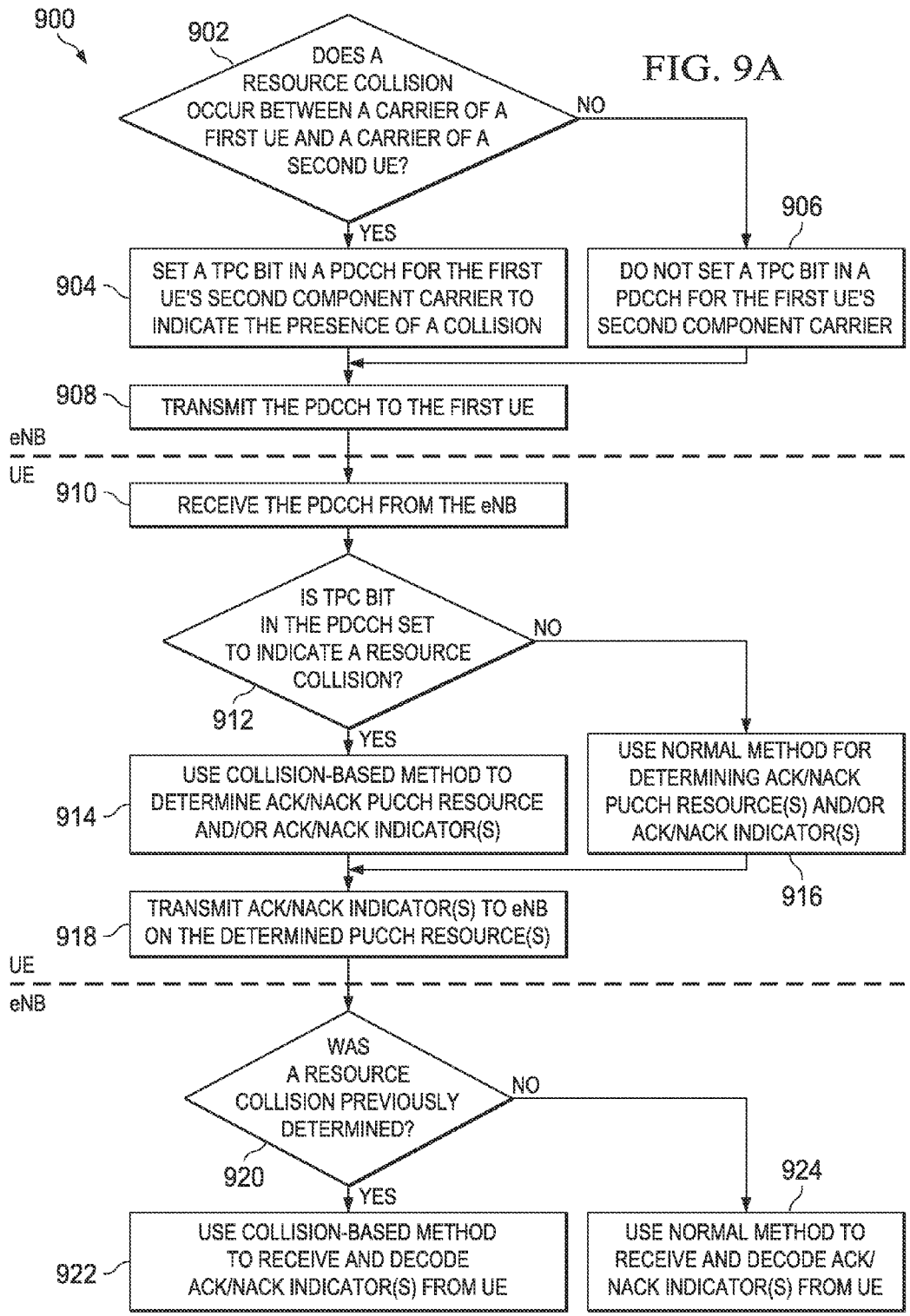

UPLINK CONTROL CHANNEL RESOURCE COLLISION RESOLUTION IN CARRIER AGGREGATION SYSTEMS

CLAIM OF PRIORITY

The present application claims priority to 35 U.S.C. §119 (e) to U.S. Provisional Patent Application No. 61/612,182 filed Mar. 16, 2012.

FIELD

The present disclosure pertains to uplink control channel resource collisions, and more particularly to physical uplink control channel resource collisions that may occur in systems using in inter-band carrier aggregation with different TDD UL/DL configurations.

BACKGROUND

In wireless communications systems, such as long term evolution (LTE) systems, downlink and uplink transmissions may be organized into two duplex modes: frequency division duplex (FDD) mode and time division duplex (TDD) mode. The FDD mode uses a paired spectrum where the frequency domain is used to separate the uplink (UL) and downlink (DL) transmissions. FIG. 1A is a graphical illustration of an uplink and downlink subframe separated in the frequency domain for the FDD mode. In TDD systems, an unpaired spectrum may be used where both UL and DL are transmitted over the same carrier frequency. The UL and DL are separated in the time domain. FIG. 1B is a graphical illustration of uplink and downlink subframes sharing a carrier frequency in the TDD mode. In LTE-Advanced, carrier aggregation allows expansion of effective bandwidth delivered to a user terminal through concurrent utilization of radio resources across multiple carriers. Multiple component carriers are aggregated to form a larger overall transmission bandwidth. Carrier aggregation may be performed in LTE-Advanced TDD or LTE-Advanced FDD systems.

DESCRIPTION OF THE DRAWINGS

FIG. 9A is a process flowchart for ACK/NACK feedback indicator signaling using a transmit power control bit.

DETAILED DESCRIPTION

Figure 1A:
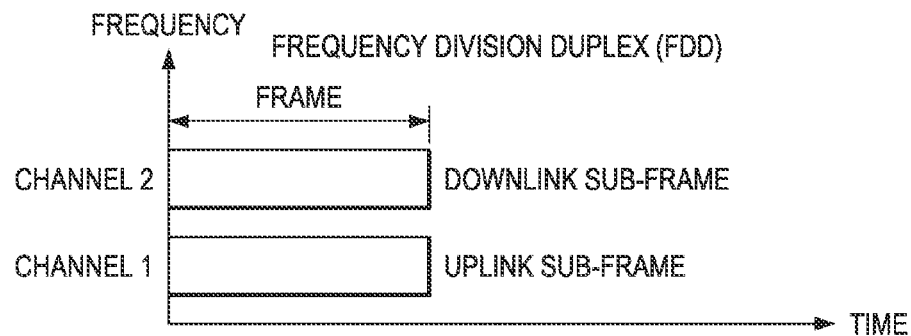
FIG. 1A is a graphical illustration of an uplink and downlink subframe separated in the frequency domain for the FDD mode.
Figure 1B:
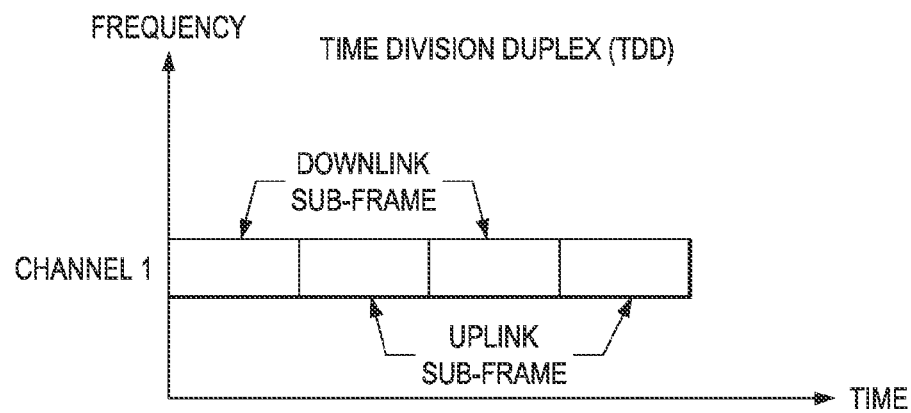
FIG. 1B is a graphical illustration of uplink and downlink subframes sharing a carrier frequency in the TDD mode.

The present disclosure pertains to uplink control channel resource collisions, and more particularly to physical uplink control channel resource collision that may occur in systems using carrier aggregation. Specific embodiments described herein relate to physical uplink control channel (PUCCH) resources in a system using inter-band carrier aggregation with different UL/DL TDD configurations. In the various implementations described in this disclosure, PUCCH resources may be used more effectively by avoiding, preventing, detecting, resolving, or mitigating various types of PUCCH resource collisions described herein.

Systems, methods, and apparatuses of certain aspects of the disclosure include identifying a resource collision between uplink channels for acknowledgement/negative acknowledgement (ACK/NACK) signaling of a first component carrier and a second component carrier. An indicator representative of the ACK/NACK signaling of the first component carrier and the second component carrier can be identified. In certain aspects, identifying the indicator includes aggregating ACK/NACK signals from each of the first component carrier and the second component carrier into a single signal. In certain aspects, aggregating ACK/NACK signals from each of the first component carrier and the second component carrier into a single signal comprises taking the logical AND of an ACK/NACK bit of the first component carrier and an ACK/NACK bit of the second component carrier.

Certain aspects include transmitting the indicator representative of the ACK/NACK signaling of the first component carrier and the second component carrier as a single signal to a base station.

In certain aspects, the indicator representative of the ACK/ NACK signaling of the first component carrier and the second component carrier comprises an ACK/NACK bit associated with one of the first component carrier or the second component carrier.

In certain aspects, the indicator representative of the ACK/ NACK signaling of the first component carrier and the second component carrier comprises an ACK/NACK bit of a component carrier having a most number of ACK/NACKs to report.

In certain aspects, the indicator representative of the ACK/ NACK signaling of the first component carrier and the second component carrier comprises at least one ACK/NACK bit associated with the component carrier determined by higher layer signaling.

In certain aspects, a user equipment can identify a resource collision between uplink control channels for acknowledgement/negative acknowledgement (ACK/NACK) signaling of a first component carrier and a second component carrier. The UE can identify an indicator representative of the ACK/ NACK signaling of the first component carrier and the second component carrier.

In certain aspects, identifying the indicator comprises aggregating ACK/NACK signals from each of the first component carrier and the second component carrier into a single signal.

In certain aspects, wherein aggregating ACK/NACK signals from each of the first component carrier and the second component carrier into a single signal comprises taking the logical AND of an ACK/NACK bit of the first component carrier and an ACK/NACK bit of the second component carrier.

In certain aspects, the UE can transmit the indicator representative of the ACK/NACK signaling of the first component carrier and the second component carrier as a single signal to a base station. In certain aspects, the indicator representative of the ACK/NACK signaling of the first component carrier and the second component carrier comprises an ACK/NACK bit associated with one of the first component carrier or the second component carrier. In certain aspects, the indicator representative of the ACK/NACK signaling of the first component carrier and the second component carrier comprises an ACK/NACK bit of a component carrier having a most number of ACK/NACKs to report. In certain aspects, the indicator representative of the ACK/NACK signaling of the first component carrier and the second component carrier comprises at least one ACK/NACK bit associated with the component carrier determined by higher layer signaling.

In some aspects of the disclosure, a method includes identifying a resource collision between control channel acknowledgement/negative acknowledgement (ACK/NACK) resources between a component carrier of a first user equipment (UE) and a component carrier of a second UE, the first UE having a primary component carrier and a secondary component carrier, the primary component carrier controlling power for the second component carrier and the second UE having one or more component carriers. Transmit power control (TPC) bits of the secondary component carrier can be assigned to indicate the collision.

In certain aspects, the TPC bits comprise a first bit and a second bit, the first bit indicating a resource collision for the primary component carrier of the first UE and one of the one or more component carriers of the second UE, and the second bit indicating a resource collision for the secondary component carrier of the first UE and one of the one or more component carriers of the second UE.

In some aspects of the disclosure, systems, methods, and apparatuses include receiving an indication of a resource collision between control channel acknowledgement/negative acknowledgement (ACK/NACK) resources between a component carrier of the first user equipment (UE) and a component carrier of a second UE. An ACK/NACK indicator on a control channel can be identified to avoid the resource collision.

In certain aspects, identifying the ACK/NACK indicator on a control channel to avoid the resource collision comprises dropping ACK/NACK feedback for the component carrier of the first UE.

In certain aspects, the first UE has a first component carrier and a second component carrier, and identifying the ACK/NACK indicator on a control channel to avoid the resource collision comprises identifying an indicator representative of the ACK/NACK signaling of the first component carrier and the second component carrier.

In certain aspects, identifying the indicator comprises aggregating ACK/NACK signals from each of the first component carrier and the second component carrier into a single signal.

In certain aspects, aggregating ACK/NACK signals from each of the first component carrier and the second component carrier into a single signal comprises taking the logical AND of an ACK/NACK bit of the first component carrier and an ACK/NACK bit of the second component carrier.

In certain aspects, the systems, methods, and apparatuses further includes transmitting the indicator representative of the ACK/NACK signaling of the first component carrier and the second component carrier in a single signal.

In certain aspects, identifying the ACK/NACK indicator on a control channel to avoid the resource collision comprises dropping ACK/NACK feedback for a predetermined component carrier.

In certain aspects, identifying the ACK/NACK indicator on a control channel to avoid the resource collision comprises dropping ACK/NACK feedback for the component carrier having a least number of ACK/NACKs.

In certain aspects, the systems, methods, and apparatuses further include transmitting ACK/NACK feedback on an uplink control channel associated with a non-collision component carrier.

Figure 2:
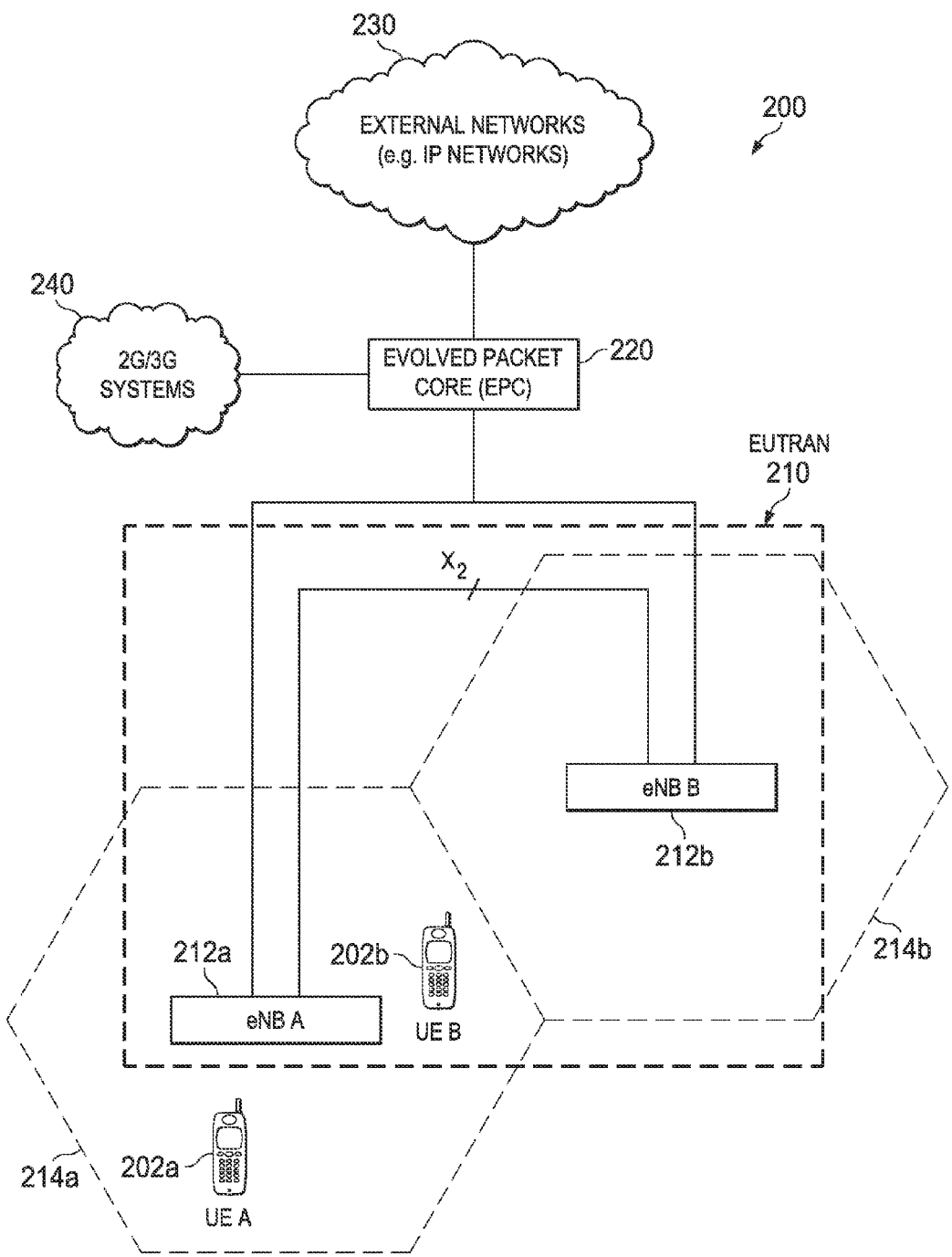
FIG. 2 is a schematic representation of an example wireless cellular communication system based on 3GPP long term evolution (LTE).

Mobile electronic devices may operate in a communications network, such as the network shown in FIG. 2, which is based on the third generation partnership project (3GPP) long term evolution (LTE), also known as Evolved Universal Terrestrial Radio Access (E-UTRA). More specifically, FIG. 2 is a schematic representation of an example wireless communication system 200 based on 3GPP LTE. The system 200 shown in FIG. 2 includes a plurality of base stations 212 (i.e., 212a and 212b). In the LTE example of FIG. 2, the base stations are shown as evolved Node B (eNB) 212a,b. In this disclosure, references to eNB are intended to refer to an access node device, such as a base station or any other communications network node that provides service to a mobile station including femtocell, picocell, or the like. The example wireless communication system 200 of FIG. 2 may include one or a plurality of radio access networks 210, core networks (CNs) 220, and external networks 230. In certain implementations, the radio access networks may be Evolved Universal Mobile Telecommunications System (UMTS) terrestrial radio access networks (EUTRANs). In addition, in certain instances, core networks 220 may be evolved packet cores (EPCs). Further, there may be one or more mobile electronic devices 202 obtaining communication services via the example wireless communication system 200. In some implementations, 2G/3G systems 240, e.g., Global System for Mobile communication (GSM), Interim Standard 95 (IS-95), Universal Mobile Telecommunications System (UMTS) and CDMA2000 (Code Division Multiple Access) may also be integrated into the communication system 200.

In the example LTE system shown in FIG. 2, the EUTRAN 210 includes eNB 212a and eNB 212b. Cell 214a is the service area of eNB 212a and Cell 214b is the service area of eNB 212b. The term cell is intended to describe a coverage area associated with a base station regardless and may or may not overlap with the coverage areas associated with other base stations. In FIG. 2, User Equipment (UE) 202a and UE 202b operate in Cell 214a and are served by eNB 212a. The EUTRAN 210 can include one or a plurality of eNBs 212 and one or a plurality of UEs can operate in a cell. The eNBs 212 communicate directly to the UEs 202. In some implementations, the eNB 212 may be in a one-to-many relationship with the UE 202, e.g., eNB 212a in the example LTE system 200 can serve multiple UEs 202 (i.e., UE 202a and UE 202b) within its coverage area Cell 214a, but each of UE 202a and UE 202b may be connected only to one eNB 212a at a time. In some implementations, the eNB 212 may be in a many-tomany relationship with the UEs 202, e.g., UE 202a and UE 202b can be connected to eNB 212a and eNB 212b. The eNB 212a may be connected to eNB 212b with which handover may be conducted if one or both of UE 202a and UE 202b travels from cell 214a to cell 214b. UE 202 may be any communications device used by an end-user to communicate, for example, within the LTE system 200. The UE 202 may alternatively be referred to as mobile electronic device, user equipment, user device, mobile device, mobile station, subscriber station, or wireless terminal. In some embodiments, UE 202 may be a cellular phone, personal data assistant (PDA), smart phone, laptop, tablet personal computer (PC), pager, portable computer, or other types of mobile communications device, including communications apparatus used in wirelessly connected automobiles, appliances, or clothing.

UEs 202 may transmit voice, video, multimedia, text, web content and/or any other user/client-specific content. On the one hand, the transmission of some of these contents, e.g., video and web content, may require high channel throughput to satisfy the end-user demand. On the other hand, the channel between UEs 202 and eNBs 212 may be contaminated by multipath fading, due to the multiple signal paths arising from many reflections in the wireless environment. Accordingly, the UEs' transmission may adapt to the wireless environment. In short, UEs 202 generate requests, send responses or otherwise communicate in different means with Enhanced Packet Core (EPC) 220 and/or Internet Protocol (IP) networks 230 through one or more eNBs 212.

A radio access network is part of a mobile telecommunication system which implements a radio access technology, such as UMTS, CDMA2000, and 3GPP LTE. In many applications, the Radio Access Network (RAN) included in a LTE telecommunications system 200 is called an EUTRAN 210. The EUTRAN 210 can be located between UEs 202 and EPC 220. The EUTRAN 210 includes at least one eNB 212. The eNB can be a radio base station that may control all or at least some radio related functions in a fixed part of the system. The at least one eNB 212 can provide radio interface within their coverage area or a cell for UEs 202 to communicate. eNBs 212 may be distributed throughout the communications network to provide a wide area of coverage. The eNB 212 directly communicates to one or a plurality of UEs 202, other eNBs, and the EPC 220.

The eNB 212 may be the end point of the radio protocols towards the UE 202 and may relay signals between the radio connection and the connectivity towards the EPC 220. In certain implementations, the EPC 220 is the main component of a core network (CN). The CN can be a backbone network, which may be a central part of the telecommunications system. The EPC 220 can include a mobility management entity (MME), a serving gateway (SGW), and a packet data network gateway (PGW). The MME may be the main control element in the EPC 220 responsible for the functionalities including the control plane functions related to subscriber and session management. The SGW can serve as a local mobility anchor, such that the packets are routed through this point for intra EUTRAN 210 mobility and mobility with other legacy 2G/3G systems 240. The SGW functions may include the user plane tunnel management and switching. The PGW may provide connectivity to the services domain including external networks 230, such as the IP networks. The UE 202, EUTRAN 210, and EPC 220 are sometimes referred to as the evolved packet system (EPS). It is to be understood that the architectural evolvement of the LTE system 200 is focused on the EPS. The functional evolution may include both EPS and external networks 230.

Though described in terms of FIG. 2, the present disclosure is not limited to such an environment. In general, telecommunication systems may be described as communications networks made up of a number of radio coverage areas, or cells that are each served by a base station or other fixed transceiver. Example telecommunication systems include Global System for Mobile Communication (GSM) protocols, Universal Mobile Telecommunications System (UMTS), 3GPP Long Term Evolution (LTE), and others. In addition to telecommunication systems, wireless broadband communication systems may also be suitable for the various implementations described in the present disclosure. Example wireless broadband communication systems include IEEE 802.11 wireless local area network, IEEE 802.16 WiMAX network, etc.

Figure 3:
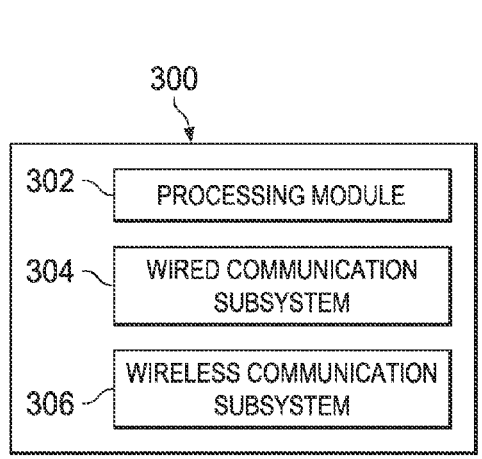
FIG. 3 is a schematic block diagram illustrating an access node device according to one embodiment.

Referring to FIG. 3, an access node device (for example, eNB 212a in FIG. 2) according to one embodiment will be described below. The illustrated device 300 includes a processing module 302, a wired communication subsystem 304, and a wireless communication subsystem 306. The processing module 302 can include a processing component (alternatively referred to as "processor" or "central processing unit (CPU)") capable of executing instructions related to one or more of the processes, steps, or actions described above in connection with one or more of the embodiments disclosed herein. The processing module 302 can also include other auxiliary components, such as random access memory (RAM), read only memory (ROM), secondary storage (for example, a hard disk drive or flash memory). The processing module 302 can execute certain instructions and commands to provide wireless or wired communication, using the wired communication subsystem 304 or the wireless communication subsystem 306. A skilled artisan will readily appreciate that various other components can also be included in the device 300.

Figure 4:
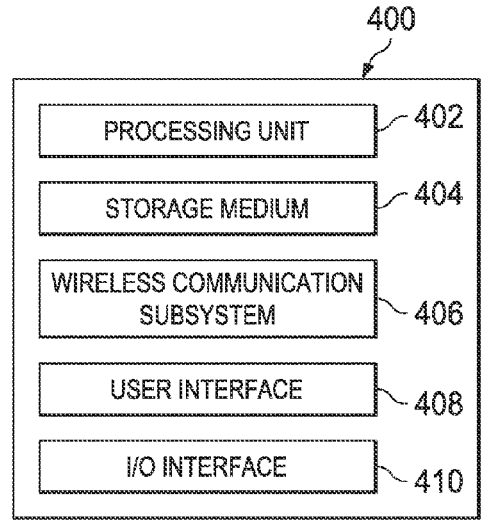
FIG. 4 is a schematic block diagram illustrating a user equipment device according to one embodiment.

FIG. 4 is a schematic block diagram illustrating a user equipment device (for example, UEs 202a, 202b in FIG. 2) according to one embodiment. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include a processing component configured to execute instructions related to one or more of the processes, steps, or actions described above in connection with one or more of the embodiments disclosed herein. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital processing (DSP) unit. In some embodiments, the wireless communication subsystem 406 can support a multiple input multiple output (MIMO) protocol.

The user interface 408 can include, for example, a screen or touch screen (for example, a liquid crystal display (LCD), a light emitting display (LED), an organic light emitting display (OLED), a microelectromechanical system (MEMS)

display), a keyboard or keypad, a trackball, a speaker, or a microphone. The I/O interface 410 can include, for example, a universal serial bus (USB) interface. A skilled artisan will readily appreciate that various other components can also be included in the device 400.

In the 3GPP LTE TDD system, a subframe of a radio frame can be a downlink, an uplink or a special subframe (the special subframe includes downlink and uplink time regions separated by a guard period for downlink to uplink switching). Currently, there are seven different UL/DL configuration schemes that may be used in LTE TDD operations, as shown in Table 1 below. Table 1 shows LTE TDD Uplink-Downlink Configurations. D represents downlink subframes, U represents uplink subframes and S represents special subframes. In each special subframe S, there are three parts which are: i) the downlink pilot time slot (DwPTS), ii) the guard period (GP) and iii) the uplink pilot time slot (UpPTS). Downlink transmissions on the physical downlink shared channel (PDSCH) may be made in DL subframes or in the DwPTS portion of a special subframe. Uplink transmissions on the physical uplink control channel (PUCCH) or physical uplink shared channel (PUSCH) may only be made in UL subframes, since the UpPTS portion of a special subframe is too short to accommodate these channels.

TABLE 1

LTE TDD Uplink-Downlink Configurations

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, there are two switch point periodicities specified in the LTE standard, 5 ms and 10 ms. 5 ms switch point periodicity is introduced to support the co-existence between LTE and low chip rate UTRA TDD systems, and 10 ms switch point periodicity is for the coexistence between LTE and high chip rate UTRA TDD systems. The supported configurations cover a wide range of UL/DL allocations from "DL heavy" 1:9 ratio to "UL heavy" 3:2 ratio. (The DL allocations in these ratios include both DL subframes and special subframes (which can also carry downlink transmissions in DwPTS).) Therefore, compared to FDD, TDD systems have more flexibility in terms of the proportion of resources assignable to uplink and downlink communications within a given amount of spectrum. Specifically, it is possible to unevenly distribute the radio resources between uplink and downlink. This will provide a way to utilize the radio resources more efficiently by selecting an appropriate UL/DL configuration based on interference situation and different traffic characteristics in DL and UL.

As understood to persons of skill in the art, UL (or DL) transmissions do not occur in every subframe in an LTE TDD system. Since the UL and DL transmissions are not continuous, scheduling and hybrid automatic repeat request (HARQ) timing relationships for an LTE TDD system are defined in the specifications. Currently, the HARQ ACK/NACK timing relationship for downlink is defined in Table 2 below. Table 2 may be used to show which uplink subframes should carry uplink HARQ ACK/NACK transmissions associated with M multiple downlink subframes. Table 2 shows downlink association set index K: $\{k_0, k_1, \ldots k_{M-1}\}$. It associates an UL sub-frame n, which conveys ACK/NACK, with DL sub-frames $n-k_i$, i=0 to M−1.

TABLE 2

Downlink Association Set Index K: $\{k_0, k_1, \ldots k_{M-1}\}$

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As an illustrative example, when using TDD UL/DL configuration 6, there are uplink subframes that occur in subframes 2, 3, 4, 7, and 8. (see also UL/DL configuration 6 in Table 1). Referring to Table 2, for the UL/DL configuration 6, at subframe 2, the downlink association set index K: $\{k_0, k_1, \ldots k_{M-1}\}$ can be represented as K: $\{7\}$.

The uplink HARQ ACK/NACK timing linkage is shown in Table 3 below. As understood to a person of skill in the art, a timing linkage represents a relationship between when downlink data is transmitted in downlink subframes and when corresponding HARQ ACK/NACK feedback is transmitted in one or more subsequent uplink subframes. Table 3 shows k values for HARQ ACK/NACK. It indicates that the physical hybrid ARQ indicator channel (PHICH) ACK/NACK received in DL sub-frame i is linked with the UL data transmission in UL sub-frame i−k, k is given in Table 3. In addition, for UL/DL configuration 0, in sub-frames 0 and 5, when $I_{PHICH}=1$, k=6. This is because there may be two ACK/NACKs for a UE transmitted on the PHICH in subframes 0 and 5.

TABLE 3 k for HARQ ACK/NACK

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | | 6 | | | | | | | 6 | 6 |
| 4 | | | | | | | | | 6 | 6 |
| 5 | | | | | | | | | 6 | |
| 6 | 6 | 4 | | | | 7 | 4 | | | 6 |

The UL grant, ACK/NACK and transmission/retransmission relationship is in Table 4 below. Table 4 shows k values for physical uplink shared channel (PUSCH) transmission. The UE shall upon detection of a physical downlink control channel (PDCCH) with DCI format 0 and/or a PHICH transmission in sub-frame n intended for the UE, adjust the corresponding PUSCH transmission in sub-frame n+k, with k given in Table 4.

For TDD UL/DL configuration 0, if the LSB of the UL index in the DCI format 0 is set to 1 in sub-frame n or a PHICH is received in sub-frame n=0 or 5 in the resource corresponding to $I_{PHICH}=1$, or PHICH is received in sub-frame n=1 or 6, the UE shall adjust the corresponding PUSCH transmission in sub-frame n+7. If, for TDD UL/DL configuration 0, both the most significant bit (MSB) and least significant bit (LSB) of the UL index field in the DCI format 0 are set in sub-frame n, the UE shall adjust the corresponding PUSCH transmission in both sub-frames n+k and n+7, with k given in Table 4.

TABLE 4 k for PUSCH transmission

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Both grant and HARQ timing linkage in TDD are more complicated than the fixed time linkages used in an LTE FDD system.

Figure 5:
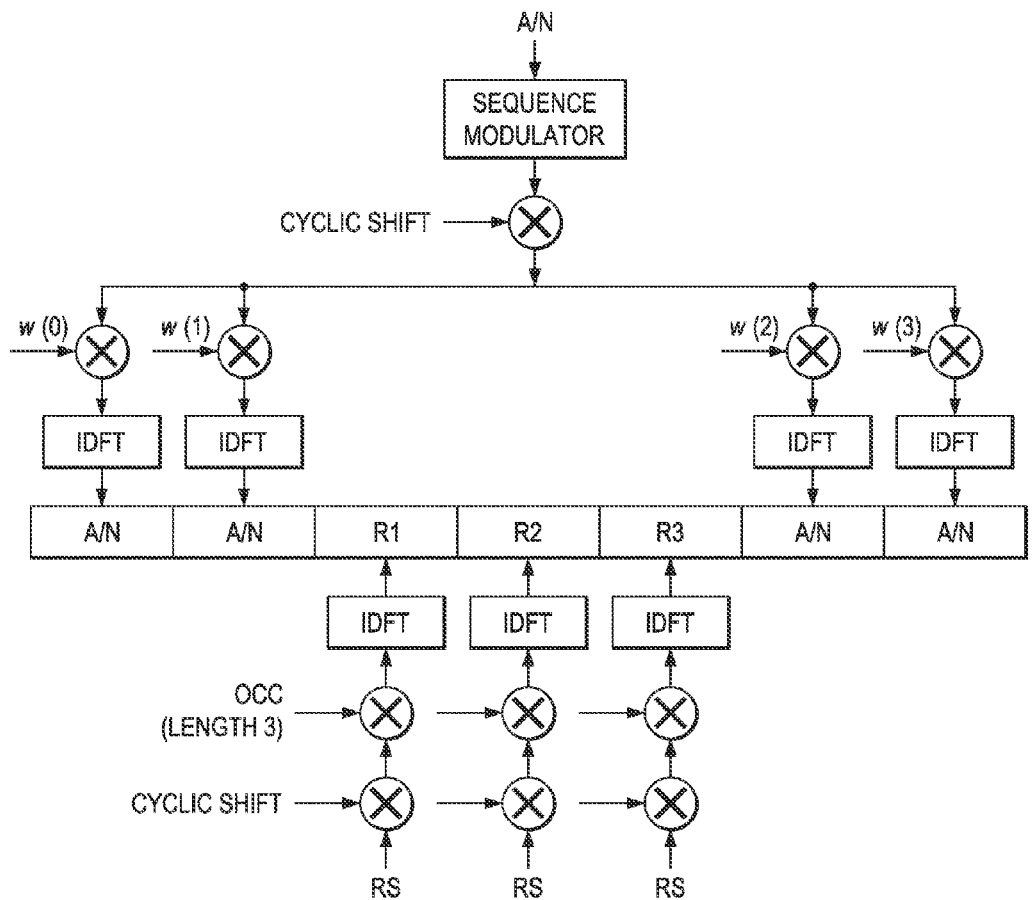
FIG. 5 is a schematic diagram of a physical uplink control channel format 1a/1b slot structure with normal cyclic prefix.

The physical uplink control channel (PUCCH) format 1a/1b may be used to transmit the ACK/NACK signalling (when ACK/NACK is not multiplexed into a PUSCH transmission). The slot structure of PUCCH formats 1a and 1b with normal cyclic prefix is shown in FIG. 5. FIG. 5 is a schematic diagram of a physical uplink control channel format 1a/1b slot structure with normal cyclic prefix. Each format 1a/1b PUCCH is in a subframe made up of two slots. The same modulation symbol is used in both slots. Without channel selection, formats 1a and 1b carry one and two ACK/NACK bits, respectively. These bits are encoded into the modulation symbol using either BPSK or QPSK modulation based on the number of ACK/NACK bits. The symbol is multiplied by a cyclic-shifted sequence with length-12. Then, the samples are mapped to the 12 subcarriers which the PUCCH is to occupy and then converted to the time domain via an IDFT. The spread signal is then multiplied with an orthogonal cover sequence with the length of 4, w(m), where $m \in \{0, 1, 2, 3\}$ corresponds to each one of 4 data bearing symbols in the slot. There are three reference symbols in each slot (located in the middle symbols of the slot) that allow channel estimation for coherent demodulation of formats 1a/1b.

Similar to FDD, for TDD, the PUCCH resource which a UE is to use may be signalled via either implicit or explicit signaling.

In the case of implicit signaling, for a PDSCH transmission indicated by the detection of corresponding PDCCH or a PDCCH indicating downlink SPS release in sub-frame $n-k_i$ where $k_i \in K$ defined in Table 2, the PUCCH resource $n_{PUCCH,i}^{(1)} = (M-i-1) \cdot N_c + i \cdot N_{c+1} + n_{CCE,i} + N_{PUCC}^{(1)}$, where c is selected from $\{0, 1, 2, 3\}$ such that $N_c \leq n_{CCE,i} < N_{c+1}$, where M is the number of elements in the set K defined in Table 2. $N_c = \max\{0, \lfloor [N_{RB}^{DL} \cdot N_{sc}^{RB} \cdot c - 4)]/36 \rfloor\}$, $n_{CCE,i}$ is the number of the first control channel element (CCE) used for transmission of the corresponding PDCCH in subframe $n-k_i$, and $N_{PUCCH}^{(1)}$ is configured by higher layers.

Figure 6:
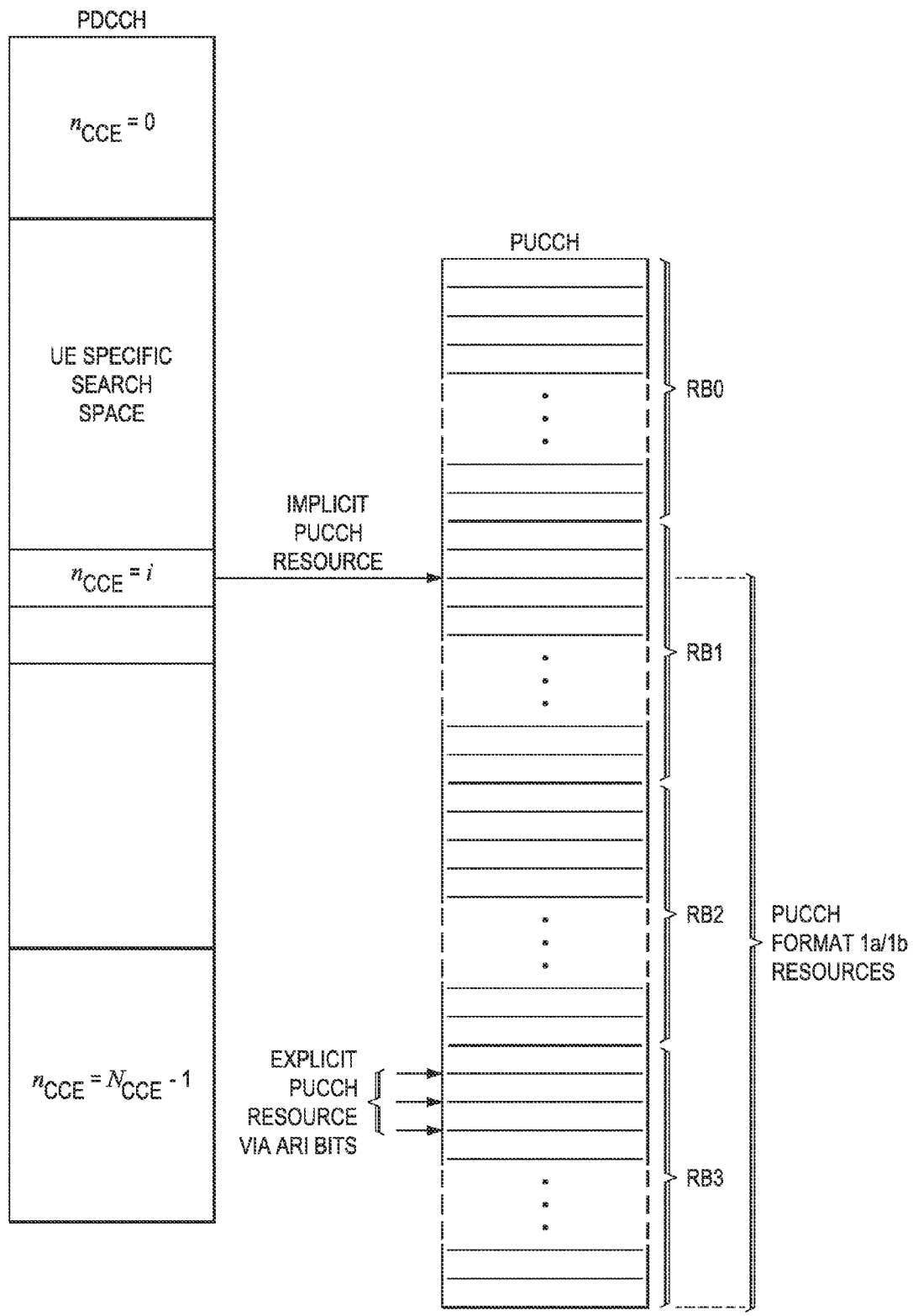
FIG. 6 is a schematic diagram showing an example physical uplink control channel resource mapping scheme.

In the case of explicit signalling, the PUCCH resource may be indicated via the ACK/NACK resource indicator (ARI) bits and/or higher layer configuration. FIG. 6 illustrates the PUCCH resource mapping scheme. FIG. 6 is a schematic diagram showing an example physical uplink control channel resource mapping scheme. In carrier aggregation (CA), PUCCH resources may be signalled implicitly using the location of the scheduling grant for the UE on the PDCCH of its primary cell (PCell). PUCCH resources may also be explicitly indicated using the ARI bits contained in the grant for the UE on the PDCCH of one of the UE's secondary cells (SCells). In some implementations, resources of the SCell may be cross carrier scheduled by the PCell. For example, a PDCCH transmitted on PCell may provide scheduling for a PDSCH on SCell. In cross carrier scheduling, the PUCCH resource allocated to a UE may be implicitly signalled by the first CCE index of the PDCCH. In other implementations, the SCell is separate-scheduled by PDCCH on SCell itself (i.e. a PDCCH on SCell refers to a PDSCH grant also on SCell), and the PUCCH resource index is determined by the ARI bits in the grant transmitted on the SCell PDCCH.

LTE-Advanced Release-10 currently only supports CA when using the same UL/DL configuration on all the aggregated carriers. Inter-band carrier aggregation with different TDD UL/DL configurations on the carriers from different bands may facilitate the bandwidth flexibility and coexistence with legacy TDD systems.

It is noted that a component carrier (CC) is also known as a serving cell or a cell. Furthermore, when multiple CCs are scheduled, for each UE, one of the CCs can be designated as a primary carrier which is used for PUCCH transmission, semi-persistent scheduling, etc., while the remaining one or more CCs are configured as secondary CCs. This primary carrier is also known as primary cell (PCell), while the secondary CC is known as secondary cell (SCell).

The timing linkage complexity in TDD systems increases, especially in view of CA with different TDD configurations, because with different TDD configurations, there are time instances with direction conflicting subframes among aggregated CCs (e.g. an UL subframe on CC1 at the same time as CC2 has a DL subframe). Also the timing linkage is different for each different TDD configuration and, furthermore, certain control signals have to be on a specific carrier, e.g. PUCCH has to be on PCell, etc. This may lead to a much greater control channel resource collision possibility in some scenarios.

Because PUCCH is transmitted on PCell in the case of inter-band CA with different UL/DL configurations, it increases the possibility of PUCCH resource collision. Described in this disclosure are two types of PUCCH resource collision. One type is that collision takes place between different UEs when ACK/NACKs from different UEs happen to use the same PUCCH resource, which may be referred to as a Type 1 collision or an inter-UE collision. Another type of collision occurs within the same UE when the PUCCH format 1a/1b resources from PCell and SCell are mapped onto the same PUCCH resource: this type of collision may be referred to as a Type 2 collision or an intra-UE collision. We consider both scenarios in this disclosure.

Figure 7A:
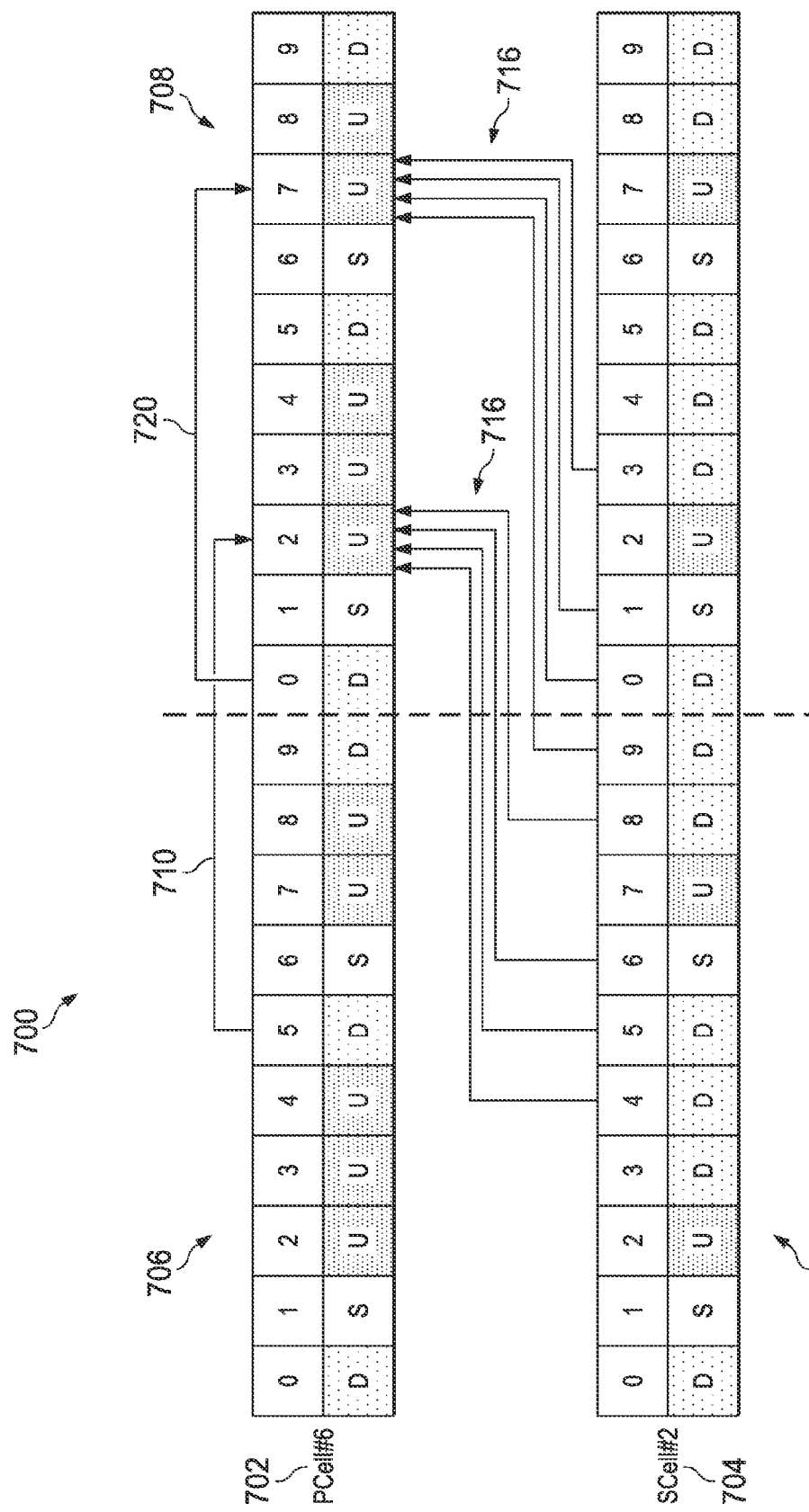
FIG. 7A is an example schematic diagram illustrating downlink hybrid automatic repeat request timing linkages in inter-band carrier aggregation with UL/DL configuration 6 on the primary cell and UL/DL configuration 2 on the secondary cell.

FIG. 7A is an example schematic diagram 700 illustrating downlink hybrid automatic repeat request (HARQ) timing linkages in inter-band carrier aggregation. In FIG. 7A, a primary cell (PCell) is utilizing UL/DL configuration 6 and a secondary cell (SCell) is utilizing UL/DL configuration 2. In the example scenario shown in FIG. 7A, two TDD carriers are aggregated, and the PCell 702 is set as UL/DL configuration 6 and SCell 704 is with UL/DL configuration 2, in full duplex mode. PCell 702 follows its own DL HARQ timing relationship, which is UL/DL configuration 6, and SCell 704 DL HARQ follows the timing of UL/DL configuration 2. The PCell 702 is shown with PDCCH configuration 706 and PUCCH configuration 708; SCell 704 is shown with PDCCH configuration 712 (PDCCH may or may not be configured on SCell). The arrows 710 represent the DL HARQ timing for a first (e.g., non-CA legacy) UE served by PCell 702; while the arrows 716 represent the DL HARQ timing of SCell 704 for a second (e.g., CA) UE. A non-CA legacy UE on the carrier with UL/DL configuration 6 will follow the original Rel. 8/9/10 timing linkage of UL/DL configuration 6.

For legacy UEs on PCell PUCCH resource is determined by the first CCE for subframe 0 grant; while for CA UEs SCell PUCCH resources are based on four different subframes.

Turning to the PUCCH format 1a/1b resource at subframe #7 720 in FIG. 7A, for a legacy non-CA UE whose serving cell has UL/DL configuration 6, the PUCCH resource is determined by the first CCE index for transmission of the corresponding PDCCH in subframe #0 as described above. For a CA UE, it may require four PUCCH resources at subframe #7 720 for ACK/NACKs from four different PDSCH subframes, #9, #0, #1 and #3. In the case of cross carrier scheduling, these PUCCH resources are determined by the same fashion as described above, but the CCE indexes used in the calculation are from the different subframes for transmission of the corresponding PDCCHs. Therefore, it may result in the same PUCCH channel resource index for the non-CA UE and the CA UE at the same UL subframe.

Figure 7B:
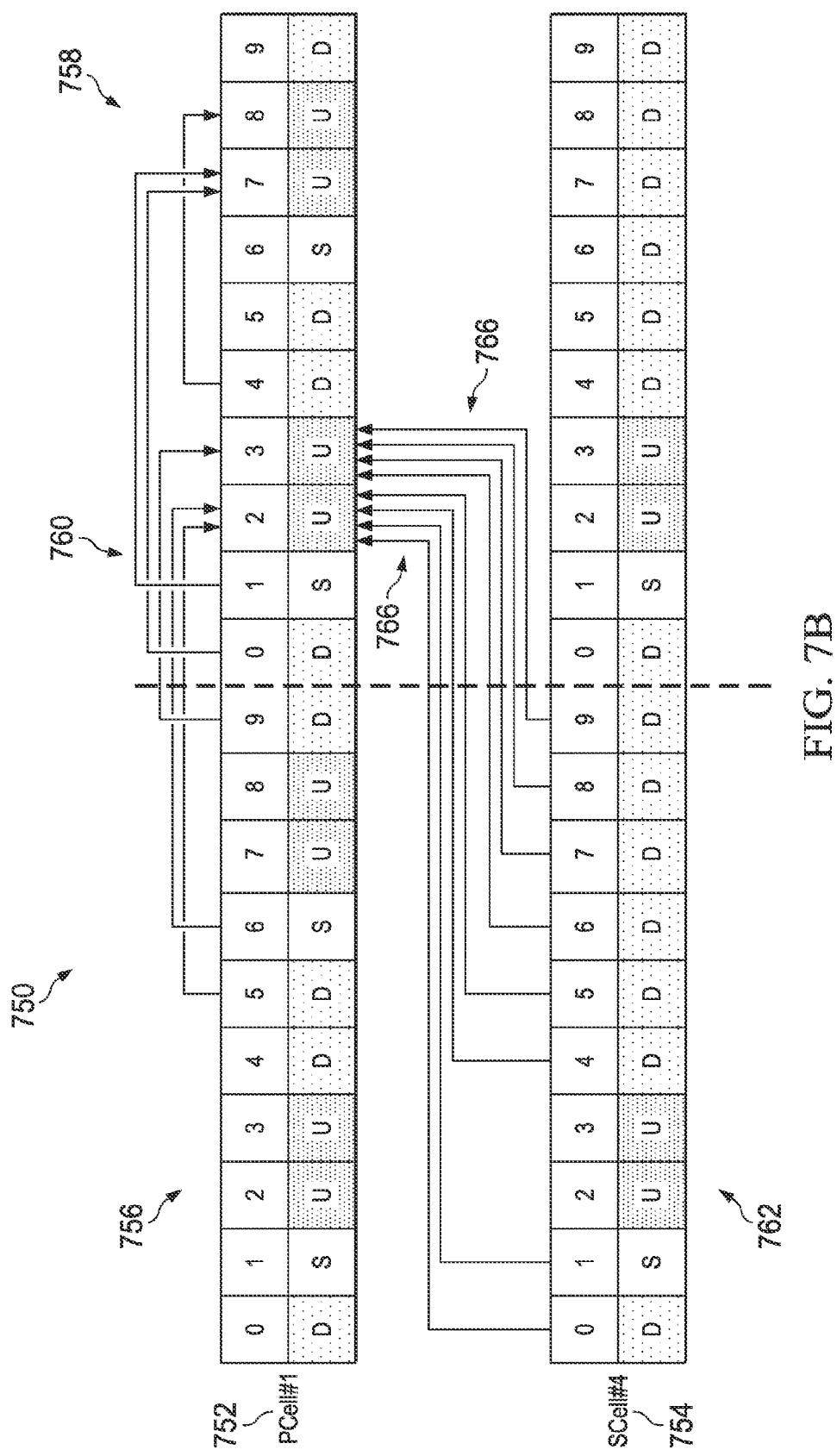
FIG. 7B is an example schematic diagram illustrating downlink hybrid automatic repeat request timing linkages in inter-band carrier aggregation with UL/DL configuration 1 on the primary cell and UL/DL configuration 4 on secondary cell.

FIG. 7B is an example schematic 750 diagram illustrating DL HARQ timing linkages in inter-band carrier aggregation with UL/DL configuration 1 on the PCell 752 and UL/DL configuration 4 on SCell 754. PCell 752 follows its own DL HARQ timing relationship, which is UL/DL configuration 1, and SCell 754 DL HARQ follows the timing of UL/DL configuration 4. The arrows 760 represent the DL HARQ timing of PCell 752, the arrows 766 represent the DL HARQ timing of SCell 754. PCell 752 includes PDCCH configuration 756 and PUCCH configuration 758. SCell 754 includes PDCCH configuration 762.

As shown in FIG. 7B, for cross carrier scheduling, the PUCCH format 1a/1b resources at subframes #2 are determined by the first CCE index for transmission of the corresponding PDCCH in subframes #5 and #6 of PCell 752 and subframes #0, #1, #4, #5 of SCell 754.

Therefore, it may result in PUCCH resource collision between PCell 752 and SCell 754 within the CA UE at subframe 2. It should be understood that the PUCCH channel index mapped from different subframes may have the same number. In FIG. 7B, a potential PUCCH resource collision may also occur in subframe 3.

In one aspect of the present disclosure include, an algorithm can be used to determine PUCCH format 1a/1b resource mapping. The algorithm may be used throughout the system, or may be selectively used in the case of inter-band CA with different TDD UL/DL configurations. Because PUCCH is transmitted only on a single cell (PCell), we have to design a single PUCCH resource mapping rule which can be applied to all component carriers in CA.

In Table 2 above, each entry represents the downlink association set index K at a subframe n for a given UL/DL configuration. For convenience in expression, two additional indexes can be assigned to K: $K_{j,n}$, with n indicating subframe number in a frame (from 0 to 9) and j representing UL/DL configuration (from 0 to 6). For example, $K_{1,2}$ refers to the subframe 2 of a carrier using UL/DL configuration 1. Referring to the information of Table 2, the following expression should be understood as representing the downlink association set index K associated for UL/DL configuration 1, subframe 2: $K_{1,2}=\{7,6\}$. Similarly, the downlink association set index K for UL/DL configuration 2, subframe 2 is represented by the expression $K_{2,2}=\{8,7,4,6\}$. The downlink association set is null at any DL or special subframe.

Figure 8A:
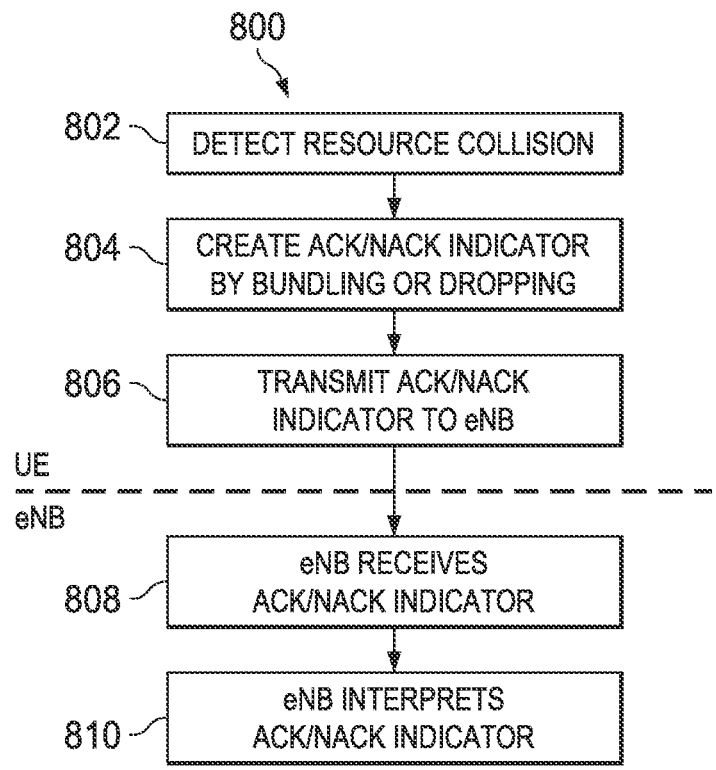
FIG. 8A is a process flowchart for ACK/NACK feedback indicator signaling at a UE.

FIG. 8A is a process flowchart 800 for ACK/NACK feedback indicator signalling at a UE. The UE detects the resource collision on its own (802). If a collision happens, UE can create an ACK/NACK indicator of an indicator type known at the eNB. The ACK/NACK indicator may be created by, e.g., bundling ACK/NACK bits across cells, i.e. PCell and SCell, or dropping ACK/NACK bits (804). For example, the UE can create a bundled acknowledgement indicator that is calculated from a logical AND of the ACK/NACK bits of PCell and SCell. The UE could drop certain ACK/NACK bits when collision occurs. For example, the UE can drop ACK/NACK bits for SCell or drop ACK/NACK bits for PCell. The UE could drop ACK/NACK bits for the cell with the smallest number of ACK/NACK bits to report (e.g. with the fewest PDSCH transport blocks). When ACK/NACK bits are dropped, this implies that those ACK/NACK bits are not signalled by the UE. For instance, if the UE drops ACK/NACK bits for SCell, then the ACK/NACK bits for SCell are not transmitted by the UE, and only the ACK/NACK bits for PCell will be transmitted by the UE. Other design choices could also be elected. At the outset, the eNB can use higher layer signalling to configure which ACK/NACK bits UE should drop in the event of a collision if ACK/NACK bit dropping is configured (e.g. instead of ACK/NACK bit bundling). The UE transmits the ACK/NACK indicator to the eNB (806). The eNB should have the knowledge of collision, so it is able to receive (808) and interpret (810) the ACK/NACK indicator. It should be understood that the ACK/NACK indicator may be used by the eNB for the purposes of determining ACK/NACK for previous downlink transmissions. However, in this disclosure the ACK/NACK indicator may also be interpreted by the eNB differently based upon whether there exists a PUCCH resource mapping collision. In this way, when a PUCCH resource collision exists, the ACK/NACK indicator may be shortened (e.g. by bundling or dropping bits) so that the PUCCH resource mapping collision does not disrupt uplink transmission of the ACK/NACK.

Figure 8B:
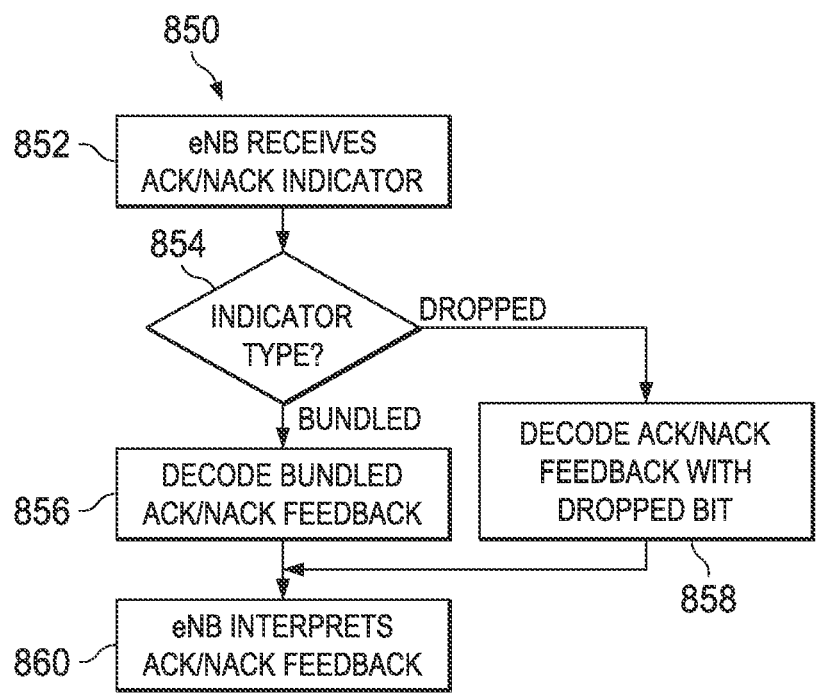
FIG. 8B is a process flowchart for ACK/NACK feedback indicator signal reception and interpretation at an eNB.

FIG. 8B is a process flowchart 850 for ACK/NACK feedback indicator signal reception and interpretation at an eNB. The eNB receives the ACK/NACK indicator from the UE (852). Depending on the indicator type (854), the eNB can decode the ACK/NACK indicator. For example, it can decode the bundled ACK/NACK indicator (856) and interpret the indicator accordingly (860). Similarly, the eNB can decode the ACK/NACK indicator with one or more dropped bits (858) and interpret the indicator accordingly (860). Herein, the term "identify" is meant to capture different functional aspects, such as choosing, selecting, receiving an indication of, determining, calculating, mapping, etc. The term "dropped" refers to truncating or shortening the ACK/NACK response that would otherwise include more bits.

The process flow of FIGS. 8A-B is applicable to the intra-UE (Type 2) collision because the bundling/dropping is only possible within the UE. In this case, the eNB is not responsible to inform the UE of any possible collision. The UE detects the resource collision on its own. If collision happens, UE bundles ACK/NACK bits across cells, i.e. PCell and SCell, or drops ACK/NACK bits as configured. In the case of ACK/NACK bit bundling, UE sends an acknowledgement indicator that is calculated from a logical AND of the ACK/

NACK bits of PCell and SCell. The eNB should have the knowledge of collision, so it is able to interpret the bundled ACK/NACK bits.

FIG. 9A is a process flowchart 900 for ACK/NACK feedback indicator signaling using one or more transmit power control (TPC) bits. The UE can identify whether a PUCCH resource collision occurs between a first PUCCH resource associated with a component carrier (either the PCell or SCell) used by a first UE and a second PUCCH resource associated with a component carrier used by a second UE (902). Alternatively, the UE can identify whether a PUCCH resource collision occurs between a first PUCCH resource associated with a first component carrier (e.g. PCell) and a second PUCCH resource associated with a second component carrier (e.g. SCell), both used by the same UE. A PUCCH resource collision may occur if the first PUCCH resource and the second PUCCH resource are associated with a same physical resource and a same uplink subframe. If a resource collision does occur, the TPC bit in a PDCCH can be set for the first UE's second component carrier (SCell) to indicate the presence of a collision (904). If there is no collision, then the TPC bit is not set (906). If the SCell power is controlled with PCell, then the TPC bits of SCell may be redefined for the purpose of explicitly signaling an inter-UE (Type 1) collision to a UE. The TPC bits of any applicable DL DCI may be used for this purpose, and power control can be obtained via DCI 3/3A signaling. The PDCCH can then be sent to the UE (908).

There are two TPC bits available, and each of these TPC bits could be assigned to indicate the absence or presence of an inter-UE (Type 1) collision for the PCell PUCCH resource of the corresponding carrier. (Note that the ACK/NACK information is transmitted on PUCCH in PCell, but PCell and SCell will have separate PUCCH resources in PCell for that ACK/NACK reporting.) For example, assume a UE configured with two carriers: CC#1 is PCell, and CC#2 is SCell. If TPC bit #1 had a value of 0, then that might indicate the absence of a Type 1 collision for the PUCCH resource on PCell intended to carry the ACK/NACK reporting for the UE's CC#1, while if TPC bit #1 had a value of 1, then that might indicate the presence of a Type 1 collision for the PUCCH resource on PCell intended to carry the ACK/NACK reporting for the UE's CC#1. Similar signaling would hold for the second TPC bit and the PUCCH resource on PCell intended to carry the ACK/NACK reporting for the UE's CC#2.

The UE can receive the PDCCH from the eNB (910). If a UE is informed of the presence of a Type 1 collision on the PCell PUCCH resource for a particular carrier (912), then it could take one of the following actions (to use a collision-based method to determine ACK/NACK PUCCH resource and/or ACK/NACK indicator(s) (914)): The UE can bundle the ACK/NACK feedback for that carrier with the ACK/NACK feedback for the other carrier (if a Type 1 collision was not indicated for the other carrier) and use the PCell PUCCH resource for the other carrier to transmit this bundled feedback. Or, the UE can drop one or more ACK/NACK bits. For example, the UE can drop the ACK/NACK feedback for that collision carrier. The UE could drop the ACK/NACK feedback for a predetermined carrier (e.g. SCell) and use the available PCell PUCCH resource for the non-collision carrier to transmit the ACK/NACK feedback for the non-dropped carrier (e.g. PCell). Or the UE could drop the ACK/NACK feedback for the carrier which has the fewest number of ACK/NACK bits to feedback, and use the available PCell PUCCH resource for the non-collision carrier to transmit the ACK/NACK feedback for the non-dropped carrier. The UE can then transmit the ACK/NACK indicator to the eNB on the determined PUCCH (918). If the TPC bit is not set to indicate a collision, then the UE can use a standard method for determining ACK/NACK PUCCH resource(s) and/or ACK/NACK indicator(s) (916).

The UE can then send the ACK/NACK indicator to the eNB (918). If a resource collision was previously identified (920), the eNB can receive use a collision-based method to receive and decode ACK/NACK indicator(s) from the UE (922). If no collision was previously identified, the eNB uses a standard method to receive and decode ACK/NACK indicator(s) from the UE (924). This solution allows an eNB to explicitly signal whether an inter-UE (Type 1) collision occurs on the PCell ACK/NACK PUCCH resource for any of the carriers assigned to a UE.

Figure 9B:
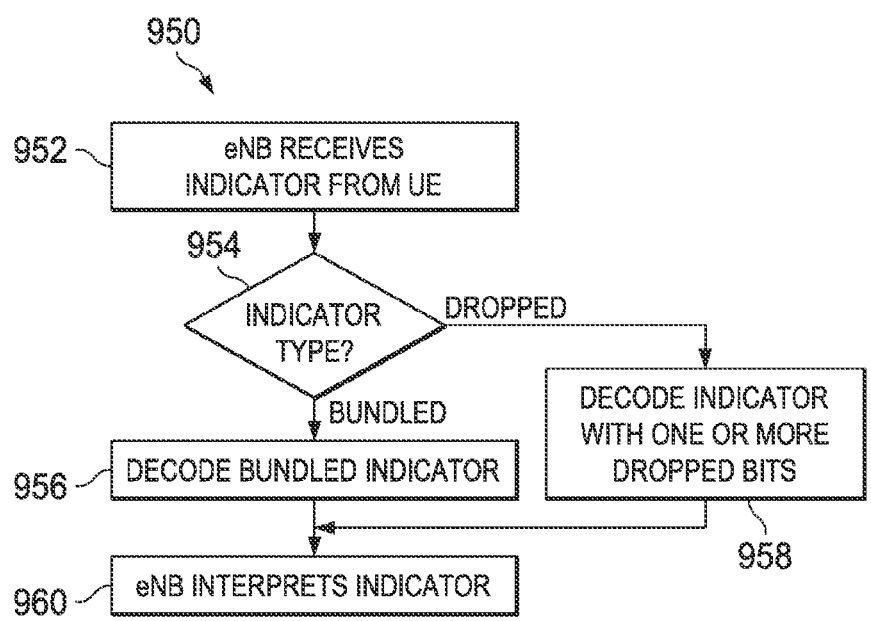
FIG. 9B is a process flowchart for ACK/NACK feedback indicator signal reception and interpretation at an eNB.

FIG. 9B is a process flowchart 950 for ACK/NACK feedback indicator signal reception and interpretation at an eNB. The eNB is aware of which inter-UE (Type 1) collisions occurred, if any. Consequently, the expected UE behaviour for ACK/NACK feedback reporting (e.g. using one of the options listed above) would be known by the eNB, and the eNB would be able to properly decode and interpret the reported ACK/NACK feedback from the UE. The eNB can easily determine and signal the appropriate values for these collision bits since the eNB is aware of whether or not any inter-UE (Type 1) collisions occur. The eNB receives the indicator (952). The eNB can decode the indicator in a manner fitting how the UE created the indicator based on the indicator type at 954. For example, if the UE bundled the TPC bits, the eNB can decode the TPC bits (956) and interpret the indicator accordingly (960). If the UE dropped one or more bits, the eNB can likewise decode the TPC bit received (958) and interpret the indicator accordingly (960).

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the disclosure.

What is claimed is:

1. A method performed in user equipment (UE) of a wireless communications network, the method comprising:
   detecting, by the UE, a resource collision between uplink channels for acknowledgement/negative acknowledgement (ACK/NACK) signaling of a first component carrier and ACK/NACK signaling of a second component carrier;

generating a single indicator including aggregating ACK/NACK signals from each of the first component carrier and the second component carrier into a single signal, wherein aggregating ACK/NACK signals from each of the first component carrier and the second component carrier into a single signal comprises at least taking the logical AND of an ACK/NACK bit of the first component carrier and an ACK/NACK bit of the second component carrier; and transmitting, to a base station, the single indicator representative of the ACK/NACK signaling of the first component carrier and the ACK/NACK signaling of the second component carrier.

2. The method of claim 1, further comprising transmitting the indicator representative of the ACK/NACK signaling of the first component carrier and the second component carrier as a single signal to a base station.

3. A user equipment (UE) for a wireless communications network comprising:

a processor operable to execute instructions comprising:

detecting, by the UE, a resource collision between uplink control channels for acknowledgement/negative acknowledgement (ACK/NACK) signaling of a first component carrier and ACK/NACK signaling of a second component carrier;

generating a single indicator including aggregating ACK/NACK signals from each of the first component carrier and the second component carrier into a single signal, wherein aggregating ACK/NACK signals from each of the first component carrier and the second component carrier into a single signal comprises at least taking the logical AND of an ACK/NACK bit of the first component carrier and an ACK/NACK bit of the second component carrier; and transmitting, to a base station, a single indicator representative of the ACK/NACK signaling of the first component carrier and the ACK/NACK signaling of the second component carrier.

4. The UE of claim 3, further comprising transmitting the indicator representative of the ACK/NACK signaling of the first component carrier and the second component carrier as a single signal to a base station.

5. A method performed at a base station of a wireless communications network, the method comprising:

detecting, by the base station, a resource collision between control channel acknowledgement/negative acknowledgement (ACK/NACK) resources between a component carrier of a first user equipment (UE) and a component carrier of a second UE, the first UE having a primary component carrier and a secondary component carrier, the primary component carrier controlling power for the second component carrier and the second UE having one or more component carriers; and transmitting transmit power control (TPC) bits of the secondary component carrier to indicate the collision, wherein the TPC bits combine the ACK/NACK signaling of the first component carrier and the ACK/NACK signaling of the second component carrier, the TPC bits comprise a first bit and a second bit, the first bit indicating a resource collision for the primary component carrier of the first UE and one of the one or more component carriers of the second UE, and the second bit indicating a resource collision for the secondary component carrier of the first UE and one of the one or more component carriers of the second UE.

6. A method performed in a first user equipment of a wireless communications network, the method comprising:

receiving, from a base station, an indication of a resource collision between control channel acknowledgement/negative acknowledgement (ACK/NACK) resources between a component carrier of the first user equipment (UE) and a component carrier of a second UE, wherein the first UE has a first component carrier and a second component carrier;

determining an ACK/NACK indicator on a control channel to avoid the resource collision, wherein the ACK/NACK indicator combines the ACK/NACK signaling of the first component carrier and the ACK/NACK signaling of the second component carrier, wherein determining the ACK/NACK indicator on a control channel to avoid the resource collision comprises determining an indicator representative of the ACK/NACK signaling of the first component carrier and the second component carrier; and transmitting ACK/NACK feedback on an uplink control channel associated with a non-collision component carrier.

7. The method of claim 6, wherein determining the ACK/NACK indicator on a control channel to avoid the resource collision comprises dropping ACK/NACK feedback for the component carrier of the first UE.

8. The method of claim 6, wherein determining the indicator comprises aggregating ACK/NACK signals from each of the first component carrier and the second component carrier into a single signal.

9. The method of claim of claim 6, wherein aggregating ACK/NACK signals from each of the first component carrier and the second component carrier into a single signal comprises at least taking the logical AND of an ACK/NACK bit of the first component carrier and an ACK/NACK bit of the second component carrier.

10. The method of claim 6, further comprising transmitting the indicator representative of the ACK/NACK signaling of the first component carrier and the second component carrier in a single signal.

11. The method of claim 6, wherein determining the ACK/NACK indicator on a control channel to avoid the resource collision comprises dropping ACK/NACK feedback for a predetermined component carrier.

12. The method of claim 6, wherein determining the ACK/NACK indicator on a control channel to avoid the resource collision comprises dropping ACK/NACK feedback for the component carrier having a least number of ACK/NACKs.

13. A user equipment (UE) of a wireless communications network, the UE being a first UE and comprising:

receiving, from a base station, an indication of a resource collision between control channel acknowledgement/negative acknowledgement (ACK/NACK) resources between a component carrier of the first UE and a component carrier of a second UE, wherein the first UE has a first component carrier and a second component carrier;

determining an ACK/NACK indicator on a control channel to avoid the resource collision, wherein the ACK/NACK indicator combines the ACK/NACK signaling of the first component carrier and the ACK/NACK signaling of the second component carrier, and determining the ACK/NACK indicator on a control channel to avoid the resource collision comprises determining an indicator representative of the ACK/NACK signaling of the first component carrier and the second component carrier; and transmitting ACK/NACK feedback on an uplink control channel associated with a non-collision component carrier.

14. The UE of claim 13, wherein determining the ACK/NACK indicator on a control channel to avoid the resource collision comprises dropping ACK/NACK feedback for the component carrier of the first UE.

15. The UE of claim 13, wherein determining the indicator comprises aggregating ACK/NACK signals from each of the first component carrier and the second component carrier into a single signal.

16. The UE of claim 15, wherein aggregating ACK/NACK signals from each of the first component carrier and the second component carrier into a single signal comprises at least taking the logical AND of an ACK/NACK bit of the first component carrier and an ACK/NACK bit of the second component carrier.

17. The UE of claim 13, further comprising transmitting the indicator representative of the ACK/NACK signaling of the first component carrier and the second component carrier in a single signal.

18. The UE of claim 13, wherein determining the ACK/NACK indicator on a control channel to avoid the resource collision comprises dropping ACK/NACK feedback for a predetermined component carrier.

19. The UE of claim 13, wherein determining the ACK/NACK indicator on a control channel to avoid the resource collision comprises dropping ACK/NACK feedback for the component carrier having a least number of ACK/NACKs.

* * * * *